United States Patent
Reemtsma

(10) Patent No.: US 6,370,387 B1
(45) Date of Patent: Apr. 9, 2002

(54) CELLULAR TELECOMMUNICATION SYSTEM WITH MACRODIVERSITY MODE

(75) Inventor: Jan-Hinnerk Reemtsma, Korntal-Münchingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/373,234

(22) Filed: Aug. 12, 1999

(30) Foreign Application Priority Data

Jul. 7, 1999 (EP) .............................................. 99440182

(51) Int. Cl.[7] .................................................. H04B 1/38
(52) U.S. Cl. ........................................ 455/453; 455/442
(58) Field of Search .................................. 455/436, 437, 455/438, 439, 442, 443, 450, 451, 452, 453, 422, 575; 370/331, 332, 335

(56) References Cited

U.S. PATENT DOCUMENTS

| | | | | |
|---|---|---|---|---|
| 4,670,899 A | * | 6/1987 | Brody et al. | 455/453 |
| 5,276,907 A | * | 1/1994 | Meidan | 455/452 |
| 5,839,056 A | * | 11/1998 | Hakkinen | 455/522 |
| 6,317,600 B1 | * | 11/2001 | Salonaho et al. | 455/453 |

* cited by examiner

*Primary Examiner*—Nay Maung
*Assistant Examiner*—Quochien B. Vuong
(74) *Attorney, Agent, or Firm*—SUGHRUE MION, PLLC

(57) ABSTRACT

A method of operating a cellular telecommunication system (30) wherein one mobile station (32) may communicate with a number of base stations (33, 34) in a macrodiversity mode, and wherein each of the base stations (33, 34) is provided with a target signal-to-interference (SIR) value. An actual load is provided for each of the base stations (33, 34), and the target SIR value of that base station (33) is increased which carries a high actual load.

8 Claims, 3 Drawing Sheets

CELLULAR TELECOMMUNICATION SYSTEM WITH MACRODIVERSITY MODE

BACKGROUND OF THE INVENTION

The invention relates to a method of operating a cellular telecommunication system wherein one mobile station may communicate with a number of base stations in a macrodiversity mode, and wherein each of the base station is provided with a target signal-to-interference (SIR) value. The invention also relates to a corresponding cellular telecommunication system.

In Direct Sequence Code Division Multiple Access (DS-CDMA) cellular telecommunication systems, a mobile station may communicate in a macrodiversity mode with a number of base stations. Due to the several established links in this mode it is possible that one of the base stations runs into a high load situation in which the base station is not able anymore to accept any mobile station as a further participant of the telecommunication system. The availability of service for the users of the system is thereby reduced.

SUMMARY OF THE INVENTION

It is an object of the invention to provide a method for operating a telecommunication system which ensures a high performance of the system in a macrodiversity mode.

For a method as described above, this object is solved according to the invention in that an actual load is provided for each of the base stations, and that the target SIR value of that base station is increased which carries a high actual load. For a telecommunication system as described above, this object is solved according to the invention by a radio network controller for providing an actual load for each of the base stations and for increasing the target SIR value of that base station which carries a high actual load.

The increase of the target SIR value has the consequence that the respective base station requests an increase of the transmission power level of the connected mobile stations. However, if one of these mobile stations is also connected to another base station in the macrodiversity mode, then this mobile station will probably not increase its transmission power level due to the connection with the other base station. This has the result that the actual SIR value of the link between this mobile station and the highly loaded base station will remain below the target SIR value.

In an advantageous embodiment of the invention, the actual SIR value is provided for any link between a mobile station and a base station, and that link is released which has a low actual SIR value.

As described, the actual SIR value of the link between that mobile station which is connected to several base stations in the macrodiversity mode, and that base station which carries a high load, is below the target SIF value. As a consequence, this link is released. The load on the respective base station is thereby reduced. However, the communication as such is not disconnected as the released link is only one connection of a number of connections of the macrodiversity mode of the respective mobile station.

The invention, therefore, has the advantage that, on one hand, the load on an overloaded base station is reduced, and that, on the other hand, only links of the macrodiversity mode are released so that no communication as such is disconnected.

It is advantageous that the actual load of each of the base stations is compared with a target load, and that the actual load is determined to be high if it exceeds the target load. As well, it is advantageous that the acutal SIR value is compared with the target SIR value, and that the actual SIR value is determined to be low if it is below the target SIR value.

BRIEF DESCRIPTION OF THE DRAWINGS

Further embodiments as well as further advantages of the invention are outlined in the following description of the enclosed figures.

DETAILED DESCRIPTION OF THE INVENTION

In a Direct Sequence Code Division Multiple Access (DS-CDMA) cellular telecommunication system, a number of mobile stations (MS) may communicate with one and the same base station (BTS) at the same time. However, due to the different distances of the moblie stations from the base station it is possible that the power levels of the different signals transmitted from the mobile stations to the base station are also different. This has the consequence that the base station receives those signals with the higher power level from the closer mobile station and is not able to detect those signals with lower power levels sent from more distant mobile stations.

In order to overcome this Near/Far-Effect, transmission power control methods are used with the goal to influence all transmitted signals such that the power level of all signals is similar at the common base station.

Figure 1:
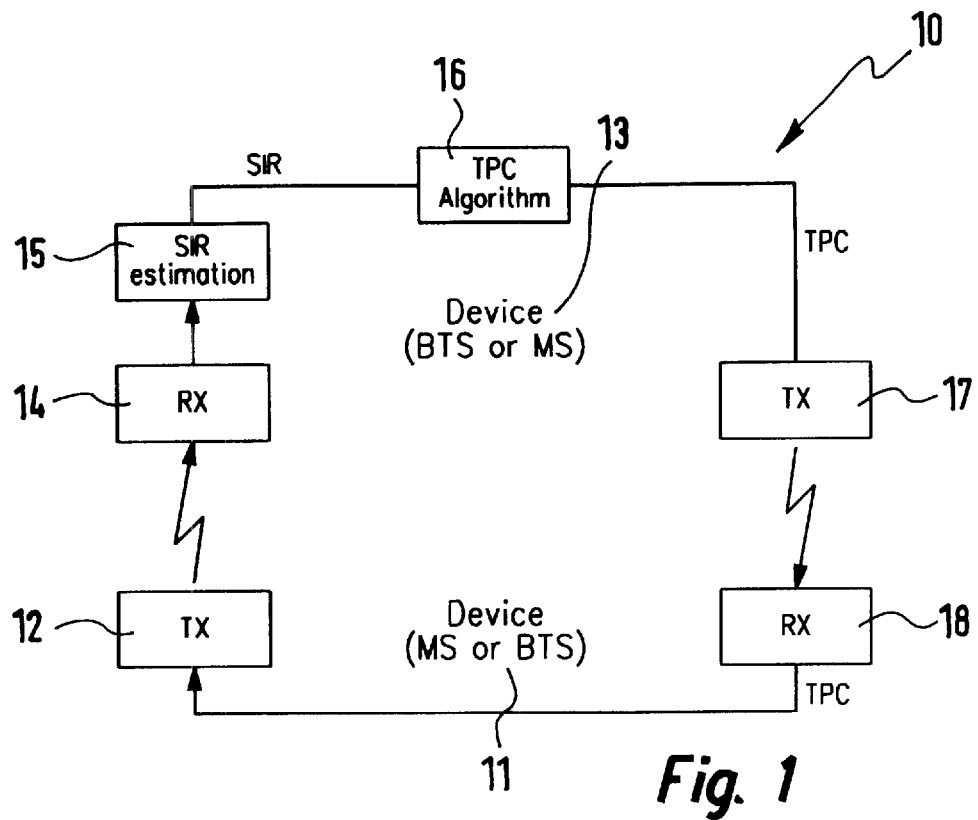
FIG. 1 shows a schematic block diagram of an embodiment of an inner-loop transmission power control method.

FIG. 1 shows such an inner-loop transmission power control method 10. A device 11 which may be a mobile station MS or a base station BTS, comprises a transmitter 12 which transmits a CDMA signal to a device 13 which may be a base station BTS or a mobile station MS. A receiver 14 of the device 13 receives the CDMA signal and a block 15 measures an actual signal-to-interference ratio (SIR) value of the received CDMA signal. Then, in a block 16, the measured SIR value is compared to a target SIR value and a transmit power control (TPC) signal is generated using a TPC algorithm. This TPC signal is then transmitted as a part of a CDMA signal back to the device 11 by a transmitter 17 of the device 13. A receiver 18 of the device 11 receives this CDMA signal including the TPC signal. Then, the power level of the device 11 is adjusted according to the received TPC signal. Depending on the TPC signal, the transmitter 12 of the device 11 will increase or decrease the power level of its transmission.

In a DS-CDMA cellular telecommunication system, one and the same mobile station may communicate with a number of base stations at the same time. In this macrodiversity mode, the mobile station is transmitting one uplink (UL) CDMA signal to the number of base stations and each of the base stations is transmitting one downlink (DL) CDMA signal to the mobile station. The number of DL CDMA signals equals the number of base stations. As already described, the respective CDMA signals comprise the above mentioned TPC signal.

Figure 2:
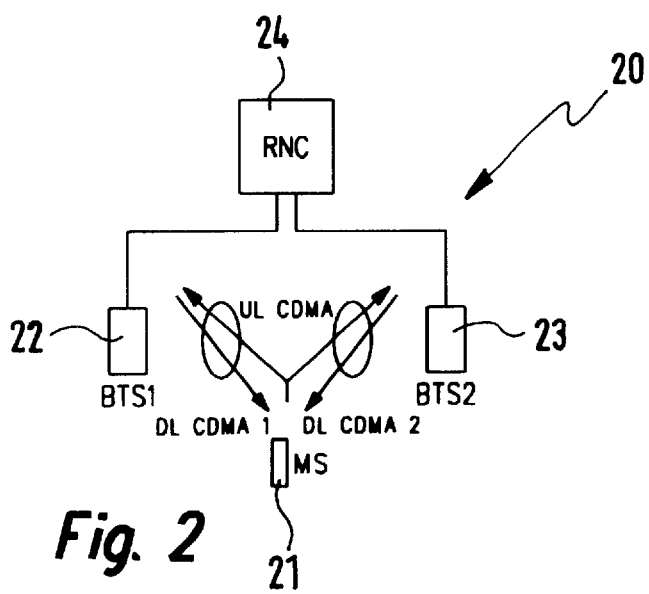
FIG. 2 shows a schematic block diagram of a first embodiment of a telecommunication system according to the invention using the method of FIG. 1.

FIG. 2 shows a telecommunication system 20 with one mobile station 21 communicating with two base stations 22, 23. The mobile station 21 transmits one UL CDMA signal to the two base stations 22, 23, the base station 22 sends a first DL CDMA 1 signal to the mobile station 21 and the other base station 23 sends a second DL CDMA 2 signal to the mobile station 21. Additionally, the two base stations 22, 23 are coupled to a radio network controller 24 in order to synchronize, among others, the two base stations 22, 23.

The two base stations 22, 23 receive the identical UL CDMA signal sent by the mobile station 21, whereas the mobile station 21 receives two different DL CDMA signals from the two base stations 22, 23, i.e. the DL CDMA 1 signal and the DL CDMA 2 signal at the same point in time. These two DL CDMA signals carry different TPC signals. Among others due to these differences of the TPC signals of the two CDMA signals, the mobile station 21 is able to seperate the synchronously received two DL CDMA signals and to process them independantly.

Figure 3:
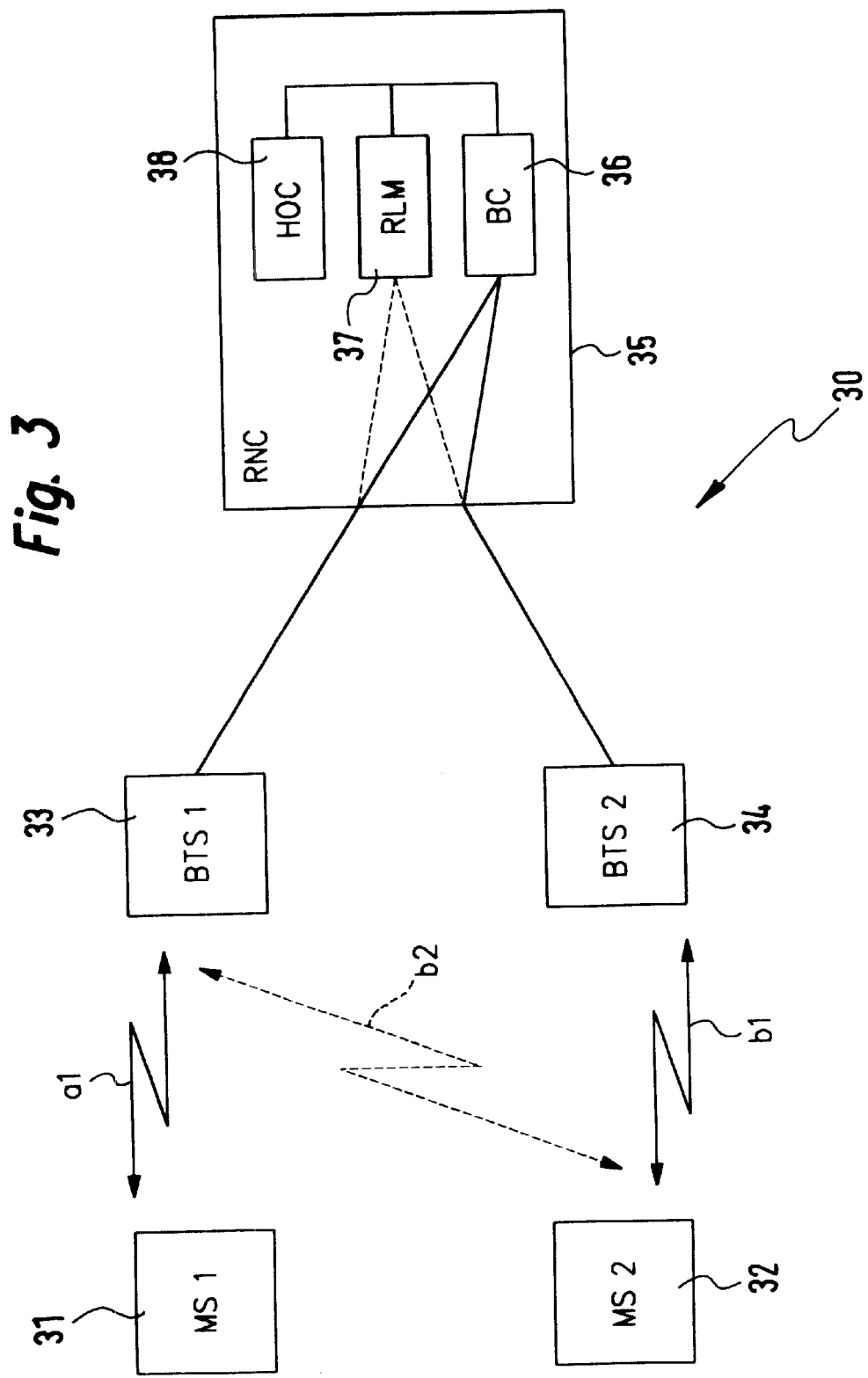
FIG. 3 shows a schematic block diagram of a second embodiment of a telecommunication system according to the invention using the method of FIG. 1.

FIG. 3 shows a telecommunication system 30 with two mobile stations 31, 32 and two base stations 33, 34. The mobile station 31 communicates with the base station 33 only, whereas the mobile station 32 communicates with both base stations 33, 34 in the above described macrodiversity mode. The link between the mobile station 31 and the base station 33 is characterized with the reference a1, the link between the mobile station 32 and the base station 34 with the reference b1 and the link between the moblie station 32 and the base station 33 with the reference b2.

The two base stations 33, 34 are connected with a radio network controller 35 which includes a bearer controller 36 which is coupled to both base stations 33, 34, a radio link manager 37 which is also coupled to both base stations 33, 34 and a handover controller 38 which is coupled to the bearer controller 36 and the radio link manager 37.

Figure 4:
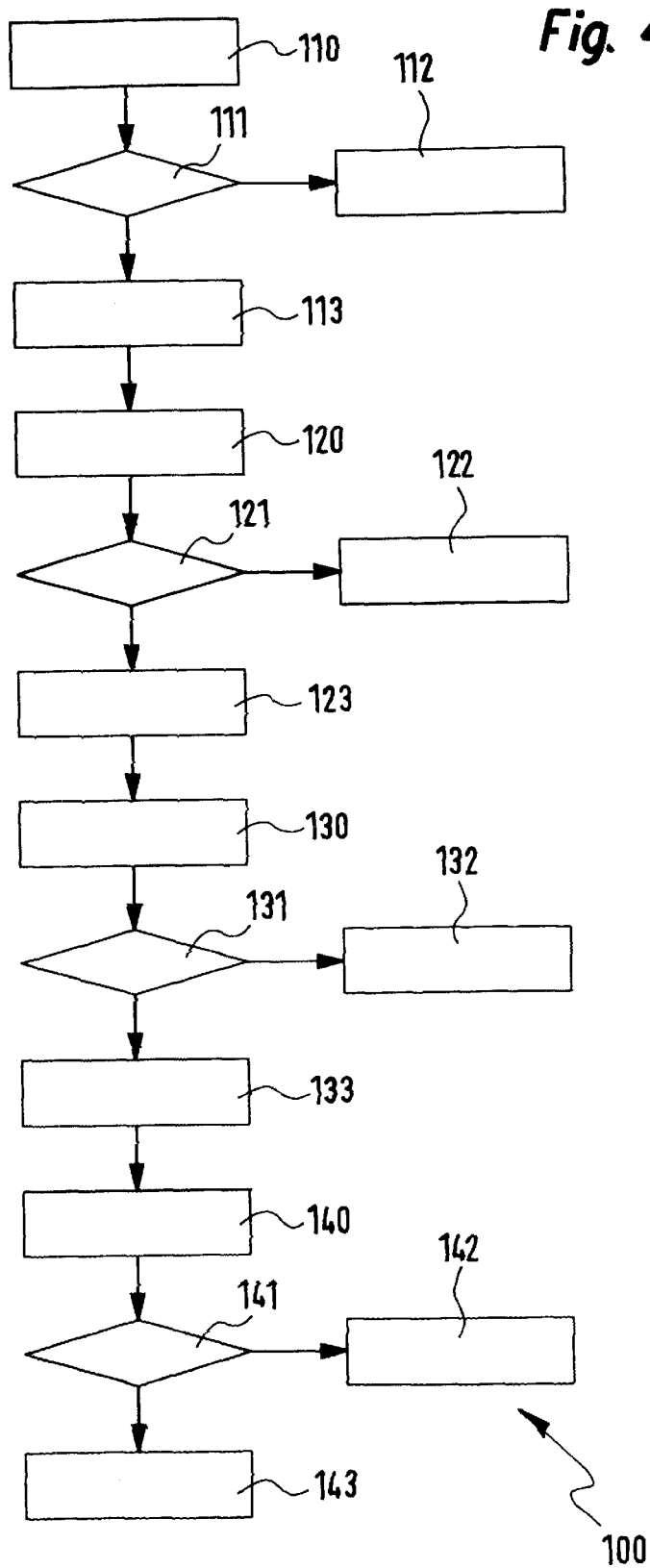
FIG. 4 shows a schematic flow diagram of an embodiment of an outer-loop transmission power control method according to the invention.

FIG. 4 shows an outer-loop transmission power control method 100. As will be seen, it influences the inner-loop transmission power control method 10 of FIG. 1 in particular in a situation of a higher load at one of the base stations.

In a block 110 of FIG. 4, the actual load of each of the base stations is provided by the bearer controller 36 of the radio network controller 35. Then, in a block 111, this actual load of each base station is compared with a target load. As long as the actual load does not exceed the target load, the target SIR value of the base stations described in connection with FIG. 1 remains unchanged according to a block 112 and the method 100 is finished. However, if the actual load exceeds the target load, the target SIR value of the base stations is increased in a block 113. The blocks 111 to 113 are performed by the radio link manager 37 of the radio network controller 35.

In a succeeding block 120, the respective actual SIR values of the base stations are measured by the respective base stations. In a block 121, the actual SIR value of each of the base stations is compared with the increased target SIR value provided by block 113. As long as the actual SIR value exceeds the target SIR value, the respective base station sends the TPC signal described in connection with FIG. 1 and requests a decrease of the transmission power level of the corresponding mobile station according to a block 122. Then, the method 100 is finished. However, if the actual SIR value is smaller than the target SIR value, the respective base station sends the TPC signal described in connection with FIG. 1 and requests an increase of the transmission power level of the corresponding mobile station according to a block 123.

In a succeeding block 130, each of the mobile stations examines the actual TPC signals received from the connected base stations. In a block 131, each of the mobile stations checks whether it has received at least one TPC signal with the request to decrease the transmission power level. If this is not the case, i.e. if all TPC signals request an increase of the transmission power level, then the respective mobile station increases its transmission power level in a block 132. Then, the method 100 is finished. However, if at least one request for a decrease is received, the respective mobile station decreases its transmission power level in a block 133.

It is now assumed that the base station 33 of FIG. 3 carries a higher load. This has the consequence that block 111 detects an actual load at the base station 33 exceeding the target load. Therefore, block 113 increases the target SIR value for the base station 33.

As the base station 33 is the only base station coupled to the mobile station 31, the mobile station will only receive one TPC signal from the base station 33. However, as the mobile station 32 is coupled to the base station 33 and to the base station 34 in the macrodiversity mode, the mobile station 32 will receive respective TPC signals from both base stations 33, 34.

Due to the increase of the target SIR value of the base station 33, this base station 33 will probably request an increase of the transmission power level of the mobile station 31. This increase is performed in block 132.

The same request for an increase of the transmission power level is also sent from the base station 33 to the mobile station 32. However, as the target SIR value of the base station 34 is not increased, this base station 34 will probably not request an increase of the transmission power level of the mobile station 32. Therefore, not all incoming TPC signals request an increase of the transmission power level of the mobile station 32 with the consequence that the transmission power level is not increased. Instead, the resulting decrease of the transmission power level is performed in block 133.

Then, after the described decrease of the transmission power level of the mobile station in block 133, the radio network controller 35 examines any of the links between the mobile stations and the base stations with respect to their actual SIR value according to a block 140. In a block 141, the actual SIR value is compared with the target SIR value of the respective base station. If the actual SIR value still exceeds the target SIR value, then the link is upheld in a block 142 and the method 100 is finished. However, if the actual SIR value is smaller than the target SIR value, then the radio network controller 35 releases the respective link in a block 143 and the method 100 is finished.

In the above described example of FIG. 3, the link a1 and the link b1 are upheld due to their actual SIR values exceeding the target SIR value. However, as the target SIR value of the base station 33 was increased and as the transmission power level of the mobile station 32 was decreased, the actual SIR value of the base station 33 with regard to the mobile station 32, i.e. with respect to the link b2, is probably smaller than the target SIR value for several measured cycles. Therefore, the link b2 is released by the radio network controller 35.

As a result, the load on the base station 33 is reduced due to the released link b2. At the same time, the transmission power level of the link a1 is increased and the transmission power level of the link b1 is decreased.

What is claimed is:

1. A method of operating a cellular telecommunication system (30) wherein one mobile station (32) may communicate with a number of base stations (33, 34) in a macrodiversity mode, and wherein each of the base stations (33, 34) is provided with a target signal-to-interference (SIR) value, characterized in that an actual load is provided (110) for each of the base stations (33, 34), and that the target SIR value of that base station (33) is increased (113) which carries a high actual load.

2. The method of claim 1, characterized in that the actual load of each of the base stations (33, 34) is compared (111) with a target load, and that the actual load is determined to be high if it exceeds the target load.

3. The method of claim 1, characterized in that an actual SIR value is provided (140) for any link (a1, b1, b2) between a mobile station (31, 32) and a base station (33, 34), and that the link (b2) is released (143) which has a low actual SIR value.

4. The method of claim 3, characterized in that the actual SIR value is compared (141) with the target SIR value, and that the actual SIR value is determined to be low if it is below the target SIR value.

5. The method of claim 1, characterized by its use in a mobile station (31, 32) of said telecommuncation system (30).

6. The method of claim 1, characterized by its use in a base station (33, 34) of said telecommuncation system (30).

7. A cellular telecommunication system (30) wherein one mobile station (32) may communicate with a number of base stations (33, 34) in a macrodiversity mode, and wherein each of the base stations (33, 34) is provided with a target signal-to-interference (SIR) value, characterized by a radio network controller (35) for providing an actual load for each of the base stations (33, 34) and for increasing the target SIR value of that base station (33) which carries a high actual load.

8. The telecommunication system (30) of claim 7, characterized by said radio network controller (35) for providing an actual SIR value for any link (a1, b1, b2) between a mobile station (31, 32) and a base station (33, 34) and for releasing that link (b2) which has a low actual SIR value.

* * * * *